(12) United States Patent
Westerman

(10) Patent No.: US 10,307,017 B2
(45) Date of Patent: Jun. 4, 2019

(54) SYSTEMS AND METHODS FOR A ROTISSERIE GRILL

(71) Applicant: Paul Westerman, Hays, TX (US)

(72) Inventor: Paul Westerman, Hays, TX (US)

(*) Notice: Subject to any disclaimer, the term of this patent is extended or adjusted under 35 U.S.C. 154(b) by 670 days.

(21) Appl. No.: 14/989,210

(22) Filed: Jan. 6, 2016

(65) Prior Publication Data
US 2016/0198894 A1    Jul. 14, 2016

Related U.S. Application Data

(60) Provisional application No. 62/101,176, filed on Jan. 8, 2015.

(51) Int. Cl.
A47J 37/04    (2006.01)

(52) U.S. Cl.
CPC ............. *A47J 37/049* (2013.01); *A47J 37/04* (2013.01)

(58) Field of Classification Search
CPC ........ A47J 37/04; A47J 37/041; A47J 37/042; A47J 37/047; A47J 37/049
USPC .... 99/393, 419, 421 HV, 421 R, 421 V, 424, 99/427, 448; 126/41 A, 154, 170, 25 R
See application file for complete search history.

(56) References Cited

U.S. PATENT DOCUMENTS

| 3,045,582 | A | | 7/1962 | Wells | |
|---|---|---|---|---|---|
| 3,372,636 | A | | 3/1968 | Marasco | |
| 4,062,340 | A | * | 12/1977 | Huff | A47J 37/0704 126/25 R |
| 4,470,343 | A | | 9/1984 | Didier | |
| 4,765,232 | A | | 8/1988 | Reid | |
| 5,473,979 | A | | 12/1995 | Ruben | |
| 5,771,600 | A | * | 6/1998 | Ronnanow | A23N 12/10 34/63 |
| 6,029,565 | A | | 2/2000 | Plymale | |
| 6,041,695 | A | | 3/2000 | Kuopus | |
| 6,272,975 | B1 | | 8/2001 | Usherovich | |
| 6,347,577 | B1 | | 2/2002 | Harneit | |

FOREIGN PATENT DOCUMENTS

WO    WO 99/47033    9/1999

* cited by examiner

*Primary Examiner* — Dana Ross
*Assistant Examiner* — James F Sims, III
(74) *Attorney, Agent, or Firm* — Pierson IP, PLLC

(57) ABSTRACT

Embodiments disclosed herein describe systems and methods for a grill with hinged containers, wherein if the grill is opened then the hinged containers may be opened, and if the grill is closed then hinged containers may not be opened.

7 Claims, 7 Drawing Sheets

SYSTEMS AND METHODS FOR A ROTISSERIE GRILL

CROSS-REFERENCE TO RELATED APPLICATIONS

This application claims a benefit of priority under 35 U.S.C. § 119 to Provisional Application No. 62/101,176 filed on Jan. 8, 2015, which is fully incorporated herein by reference in its entirety.

BACKGROUND INFORMATION

Field of the Disclosure

Examples of the present disclosure are related to systems and methods for a rotisserie grill. More particularly, embodiments relate to a grill with hinged containers, wherein if the rotisserie grill is opened then the hinged containers may be opened, and if the rotisserie grill is closed then hinged containers may not be opened.

Background

Grilling is a form of cooking that involves dry heat being applied to a surface of food. Grilling typically requires a significant amount of direct, radiant heat, and is be utilized for cooking food quickly.

Conventionally when utilizing a rotisserie to grill food, food is placed on a skewer within a chamber. The skewer is rotated about an axis over a heat source, wherein the heat source is charcoal, gas, firewood, or convection ovens.

When the skewer rotates the food within the chamber, the heat evenly cooks the food while the food bastes in its own juices. However, when a skewer is rotating within the chamber, some of food's juices will fall to the bottom of the chamber. Additionally, while the skewer is rotating, heat associated with the food item will dissipate outside of the food chamber, delaying cooking of the food.

Moreover, conventional rotisserie grills also require additional space to allow for the food items to rotate at a direction between proximal and distal ends of the chamber. Thus, this configuration requires the rotisserie grills to be large and not portable.

Accordingly, needs exist for more effective and efficient systems and methods for a grill with hinged containers, wherein if the grill is opened then the hinged containers may be opened, and if the grill is closed then hinged containers may not be opened.

SUMMARY

Embodiments disclosed herein describe systems and methods for a grill with hinged containers. In embodiments, if the grill is opened then the hinged containers may be opened, and if the grill is closed then hinged containers may not be opened. In embodiments, the grill may be a rotisserie grill including a chamber defined by a plurality of sidewalls, a lid, a shaft, and a plurality of hinged containers.

The chamber may be an oven or vertical grill that is configured to be stationary or portable depending on the chamber's size. The chambers internal dimensions may be extended from an internal surface of a front sidewall to the internal surface of a back sidewall. The chamber may include a lower portion and an upper portion, wherein the upper portion includes a lid. The lid may be a hinged seal, cover, etc. configured to be opened and closed. When the lid is closed, the hinged containers positioned within a body of the chamber may not be opened. When the lid is open, the hinged containers may be opened when the hinged containers are positioned at the upper portion of the chamber.

In embodiments, a shaft may extend from the front sidewall to the rear sidewall of the chamber, and may secure the hinged containers within the chamber. The shaft may form a rotational axis, wherein the hinged containers may rotate, turn, revolve, etc. around the shaft between a first side and second side of the chamber.

In embodiments, each of the plurality of hinged containers may be a device that is configured to store, hold, contain, etc. food products positioned within the hinged containers. Each hinged containers may include two separate portions that are configured to open and close. The hinged containers may be configured to be opened to allow food to be added or removed from a body of the hinged containers. The hinged containers may be configured to be closed to secure food within the hinged containers.

In embodiments, a hinged container may be shaped and/or sized such that when the hinged container is within the chamber, the outer surfaces of the hinged container are positioned adjacent to the inner surface of a sidewall of the chamber. Therefore, when the lid is closed, the hinge on the hinge container may not be expanded due to the force applied by the sidewall of the chamber. Thus, while the hinged container is within the chamber, the hinged container may not be opened.

In embodiments, responsive to the lid of the chamber being opened, a first outer surface of the hinged container may not be positioned adjacent to an inner surface of the front sidewall. Therefore, when the lid of the chamber is opened, a hinged container positioned in the upper portion of the chamber may rotate forward to open the hinged container.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
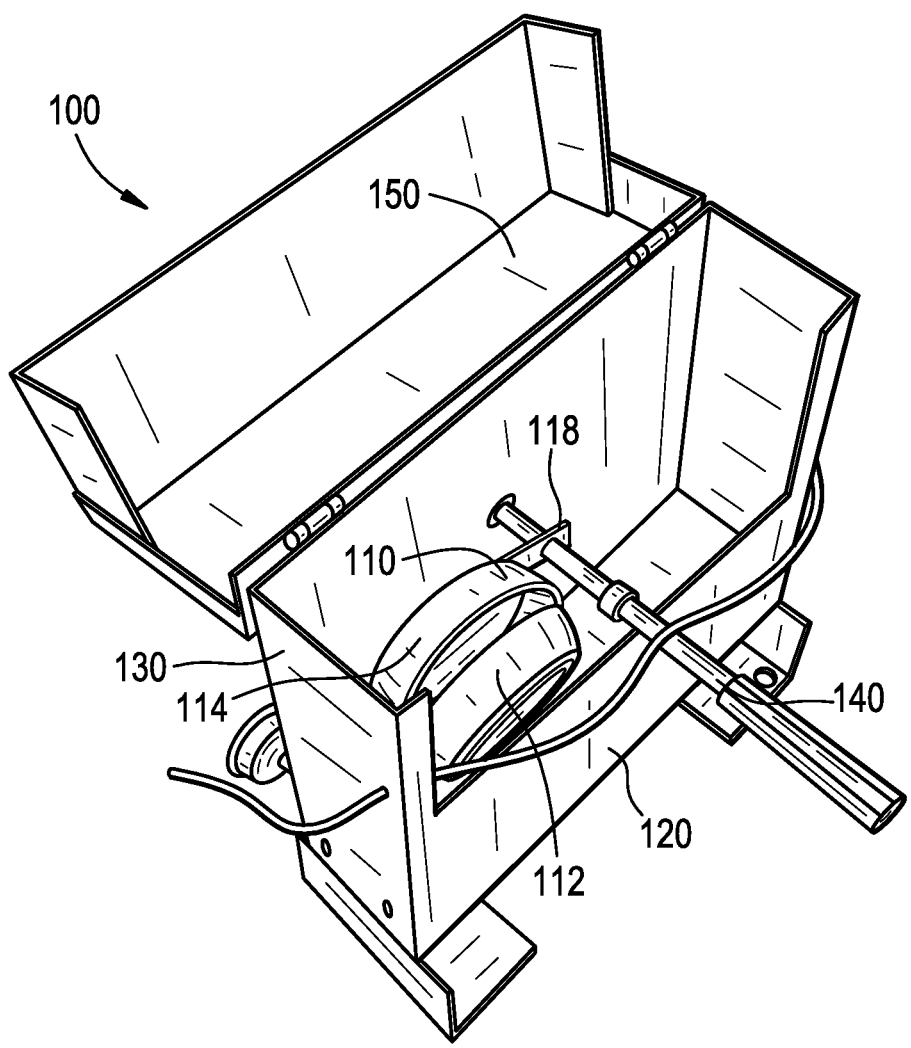
FIG. 1 depicts a perspective view of a grill with a hinged container, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Embodiments disclosed herein describe systems and methods for a grill with hinged containers, wherein if a lid on the grill is opened then the hinged containers may be opened, and if lid on the grill is closed then hinged containers may not be opened.

FIG. 1 depicts a perspective view of a grill 100 with a hinged container 110. Grill 100 may be configured to apply heat to a surface of food positioned within hinged container 110. Grill 100 may be comprised of any desired material and may be any desired shape and/or size, wherein food may be cooked. Based on the size and/or shape of grill 100, grill 100 may be a stationary, fixed cooking apparatus or grill 100 may be a moveable, portable cooking apparatus.

Grill 100 may include hinged container 110, a front sidewall 120, a rear sidewall 130, shaft 140, and lid 150.

Hinged container 110 may be configured to store food positioned within hinged container 110. For example, steaks, vegetables, etc. may be placed within the body of hinged container 110 and cooked when hinged container is positioned within grill 100. One skilled in the art will appreciate that grill 100 may include a plurality of hinged containers. For example, grill 100 may include two, four, six, eight, etc. hinged containers. Additionally, hinged container 110 may be configured to revolve, turn, rotate, etc. between a first side and a second side of grill 100 around a fixed axis defined by shaft 140.

Hinged container 110 may include a front portion 112, rear portion 114, hinge 116, and coupling member 118. Front portion 112 may be a portion of hinged container 110 that is configured to be positioned proximate to a front sidewall 120 of grill 100, and rear portion 114 may be a portion of hinged container 110 that is configured to be attached to coupling member 118. Front portion 112 and rear portion 114 may be coupled together via hinge 116.

Hinge 116 may be a bearing that couples front portion 112 and rear portion 114 together, while allowing an angle of rotation between front portion 112 and rear portion 114. Hinge 116 may be comprised of flexible material and/or moving components. In embodiments, hinge 116 may be configured to allow rear portion 114 to be positioned in a fixed, upright position, while allowing front portion 112 to rotate towards front sidewall 130 of grill 100. In embodiments, hinge 116 may allow front portion 112 to rotate up to ninety degrees to form a right angle between front portion 112 and rear portion 114, and allow front portion 112 to rotate such that front portion 112 and rear portion 114 are vertically aligned with each other. Furthermore, hinge 116 may be configured to allow inner circumferences of front portion 112 and rear portion 114 to be positioned adjacent to each other when hinged container 110 is closed, and allow the inner circumferences of front portion 112 and rear portion 114 to be positioned apart when hinged container 110 is opened. In embodiments, gravitational forces and hinge 116 may cause front portion 112 to be configured to constantly attempt to rotate forward.

Coupling member 118 may be a device that is configured to couple hinged container 110 to grill 100. Coupling member 118 may include screws, bolts, etc. and a shaft, wherein coupling member 118 may be coupled to shaft 140. In embodiments, coupling member 118 may be configured to receive rotational force from shaft 140 to rotate hinged container 110 around shaft 140. In embodiments, coupling member 118 may be configured to maintain rear portion 114 in a fixed, upright position. When rear portion 114 is in an upright position, rear portion 114 extends perpendicularly away from shaft 140. Coupling member 118 may be attached to shaft 140, and be positioned adjacent to rear portion 114 when grill 100 is opened and closed. In embodiments, coupling member 118 may be positioned behind or between rear portion 114 and shaft 140.

Front sidewall 120 and a rear sidewall 130 may be planar surfaces configured to define a front boundary and a rear boundary, respectively, of grill 100. Accordingly, a grilling chamber may be formed between front sidewall 120 and rear sidewall 130. Front sidewall 120 may extend in a direction parallel to a direction of rear sidewall 130. In embodiments, front sidewall 120 and rear sidewall 130 may be any desired shape and/or size with planar faces.

The distance between front sidewall 120 and coupling member 118 or rear portion 114 may be slightly greater than a distance between an outer surface of front portion 112 of hinged container 110 to an outer surface of rear portion 114 of hinged container 110. Therefore, when hinged container 110 is positioned within grill 100, the outer surface of front portion 112 may be positioned adjacent to front sidewall 120, and the outer surface of rear portion 114 may be positioned adjacent to coupling member 118. In further embodiments, a distance between front sidewall 120 and rear sidewall 130 may be slightly greater than the distance between an outer surface of front portion 112 to a rear portion 114 of hinged container 110. Accordingly in these embodiments, rear sidewall 130 may be configured to secure rear portion 114 in the upright position instead of coupling member 130.

Responsive to hinged container 110 being positioned within grill 100, gravitational force may cause front portion 112 of hinged container 110 to apply force to front sidewall 120 of grill 100. Yet, front sidewall 120 of grill 100 be positioned adjacent to front portion 114, which may not allow front portion 112 to rotate forward. Therefore, hinged container 110 may remain in a closed position when inside a closed grill 100.

Shaft 140 may be an axle that is configured to transmit torque and rotation to hinged container 110. Shaft 140 may be configured to receive force from a motor or a hand-operated handle to rotate. Responsive to receiving the force, shaft 140 may rotate, and turn hinged container 110 that is coupled to shaft 140. Shaft 140 may be configured to extend from front sidewall 120 to rear sidewall 130 of grill 100, wherein shaft 140 defines an axis of rotation for hinged container 110 around shaft 140. In embodiments, shaft 140 may be configured to be inserted into or rest on holes or slots in disposed on sidewalls 120, 130. The holes or slots may be configured to allow shaft 140 to rotate freely, and allow shaft 140 to be easily removed and reconfigured with more or fewer hinged containers 110.

Lid 150 may be a cap, cover, seal, etc. of grill 100. Lid 150 may be configured to move to open and close grill 100. When lid 150 is positioned over grill 100, lid 150 may cover grill 100 and grill 100 may be in a closed position. Responsive to moving lid 150 to uncover grill 100, grill 100 may be in an open position. In embodiments, lid 150 may be permanently coupled to rear sidewall 130 via a hinge, where lid 150 may rotate to open or close. However, in other embodiments, lid 150 may be any form of removable cap, cover, seal, etc. When lid 150 is closed, a rear sidewall of lid 150 may align with rear sidewall 130 of grill 100, such that the rear sidewall of lid 150 is substantially an extension of rear sidewall 130 of grill 100. Additionally, when lid 150 is closed, a front sidewall of lid 150 may align with a front sidewall 120 of grill 100, such that the front sidewall of lid 150 is substantially an extension of front sidewall of grill 100. In embodiments, a grill may have a plurality of lids, such that a first lid may cover front end 120 and a second lid may cover rear sidewall 130.

When hinged container 110 is positioned within grill 100, the outer surface of front portion 112 may be positioned adjacent to a front sidewall of lid 150, and the outer surface of rear portion 114 or coupling member 118 may be positioned adjacent to rear sidewall 130. Responsive to hinged container 110 being positioned within grill 100, gravitational force may cause front portion 112 of hinged container 110 to apply force to front sidewall of lid 150. Yet, front sidewall of lid 150 may not allow front portion 112 to rotate forward. Therefore, hinged container 110 may remain in a closed position when lid 150 is covering grill.

In embodiments, responsive to moving lid 150 to no longer cover an entirety of grill 100, the front sidewall of lid 150 may no longer be aligned with front sidewall 120 of grill 100. Therefore, when lid 150 is removed, at least a portion of grill may not be covered. If hinged container 110 is rotated to the uncovered portion of grill 100, then the outer surface of rear portion 114 of hinged container 110 may be positioned adjacent to coupling member 118 but the outer surface of front portion 112 of hinged container 110 may not be positioned adjacent to front sidewall 120. When lid 150 is removed and hinged container 110 is positioned within the uncovered portion of grill 110, front portion 112 of hinged container 110 may be configured to rotate downward to open hinged container 110 via gravitational force.

When lid 150 is in the opened positioned and hinged container 110 is in the opened portion of grill 100, front portion 112 of hinged container 110 may be rotated forward to open hinged container 110. When hinged container 110 is opened food may be positioned in or removed from hinged container 110. Furthermore, when lid 150 is removed and hinged container 110 is not positioned within the uncovered portion of grill 110, hinged container 110 may remain in the closed position due to the forces applied on hinged containers by sidewall 120 and coupling member 118.

Figure 2:
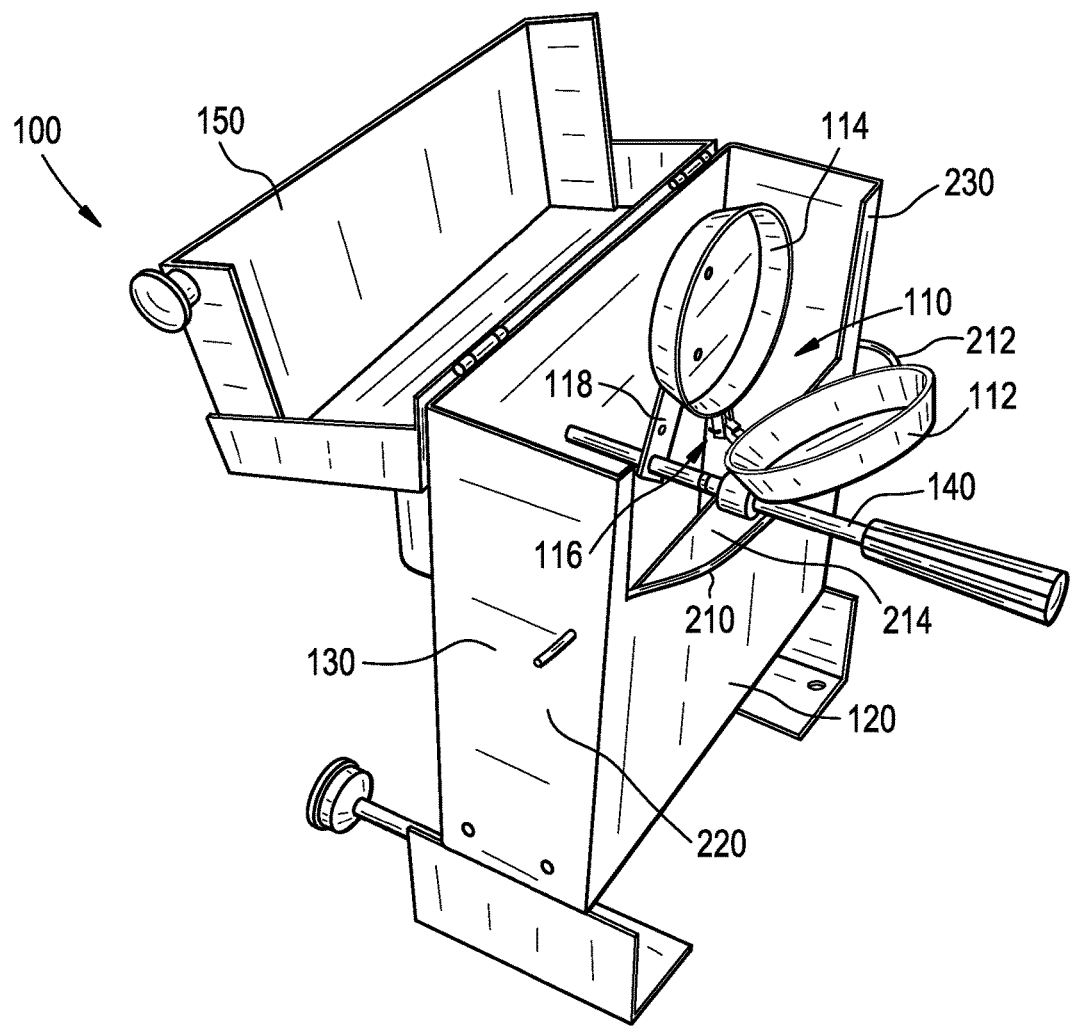
FIG. 2 depicts a grill in the opened position, according to an embodiment.

FIG. 2 depicts one embodiment of grill 100 in the opened position. In the opened position, lid 150 doesn't cover a portion of grill 100. Responsive to lid 150 not covering a portion of grill 100, if hinged container 110 is positioned within the opening, hinged container 110 may be opened by rotating front portion 112 away from rear portion 114. When front portion 112 is rotated away from rear portion 114, the outer surface of front portion 112 may be positioned adjacent to rail 210.

Rail 210 may be positioned at a lower surface of the opening above first sidewall 120 of grill 100. Rail 210 may extend from a first side 220 of grill 100 to a second side 230 of grill 100, wherein rail 210 is positioned away from an outer surface of front sidewall 120. Rail 210 may have two concave projections 212, wherein the peaks 214 of the concave projections 212 is positioned between shaft 140 and first side 220 and second side 230. In embodiments, the distance between front sidewall 120 and rail 210 may be greatest at peaks 214.

Concave projections 212 may assist maintaining hinged container 110 in the open position, while also assisting hinged container 110 from transition from the open position to a closed position. Because the distance between sidewall 120 and rail 210 varies based on concave projections 212, as hinged container 110 is rotated towards the ends of grill 100, gravitational forces allow front portion 112 to slide from the open position to the closed position via rail 210. More specifically, while hinged container 110 is rotated between the opened and closed position, a front portion 112 of hinged container 110 may remain in contact with rail 210 to more smoothly allow hinged container 110 to be opened and closed. In embodiments, the functionality associated with rails 210 could be constructed and integrated as part of sidewalls 120 or 130.

Figure 3:
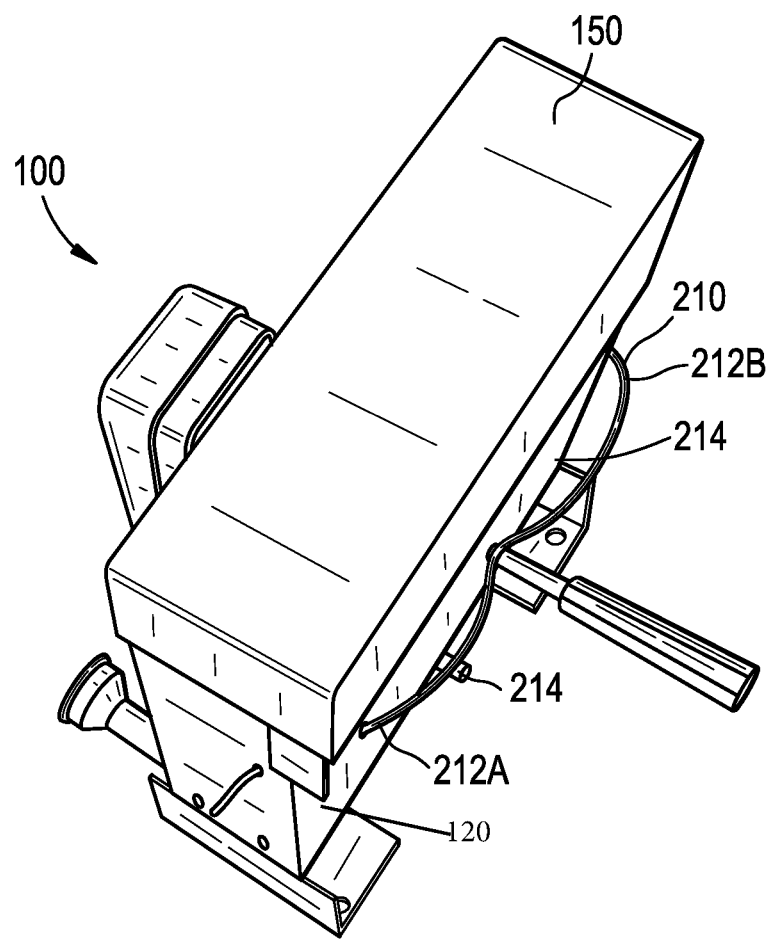
FIG. 3 depicts a grill in the closed position, according to an embodiment.

FIG. 3 depicts one embodiment of grill 100 being in the closed position. As depicted in FIG. 3, lid 150 covers the potentially opened portion of grill 100, wherein a front surface of lid 150 is an extension of first sidewall 120. Furthermore, FIG. 3 depicts rail 210 with two concave projections 212(A) and 212(B), wherein each of the concave projections 212(A) and 212(B) have corresponding peaks 214. The dual placement of rails 210 is configured to allow hinged container 110 to be opened in closed while rotating in a first or second direction.

Figure 4:
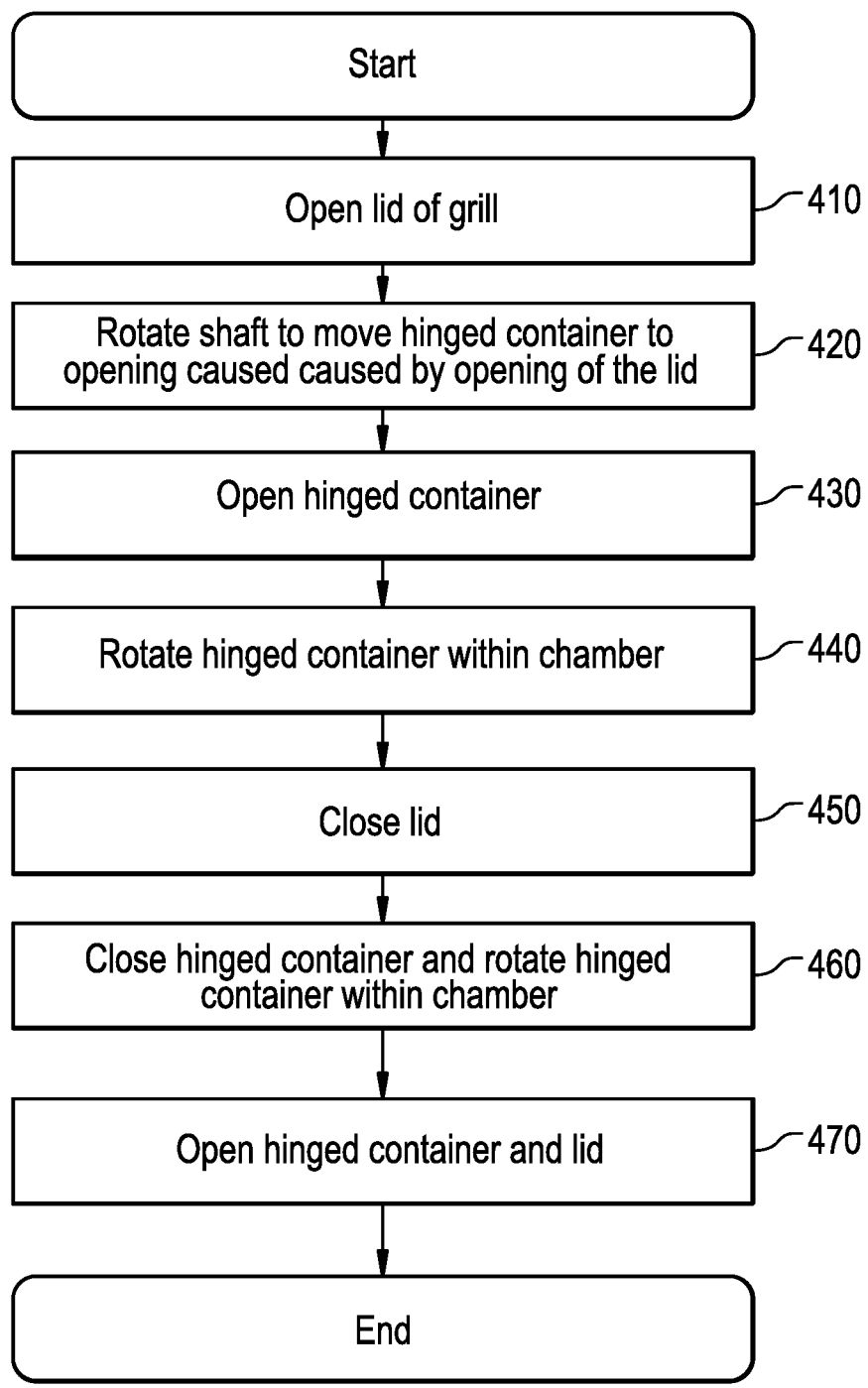
FIG. 4 depicts a method for preparing food utilizing a grill, according to an embodiment.

FIG. 4 depicts a method 400 for preparing food utilizing a vertical grill. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

At operation 410, a lid of the vertical grill may be opened. Responsive to opening the lid of the vertical grill, an inner chamber of the vertical grill may be accessed via an opening of the grill that was previously covered by the lid.

At operation 420, a shaft may be rotated to move a hinged container within the inner chamber from a lower portion of the grill to the opening within the grill.

At operation 430, responsive to moving the hinged container to the opening within the grill, a front portion of the hinged container may rotate towards the front sidewall of the grill. When rotating the front portion of the hinged container, the front portion of the hinged container may be rotated up to a ninety degree angle with respect to a rear portion of the hinged container, wherein the rear portion of the hinged container may be positioned adjacent to a coupling member. When the hinged container is opened, food may be placed on the front portion and/or within the hinged container.

At operation 440, the shaft may be rotated to move the hinged container from the opening within the grill to a position within the lower portion of the grill. In embodiments, when the hinged container is within the lower portion of the grill, the rear portion of the hinged container may be positioned adjacent to the coupling member and the front portion of the hinged container may be positioned adjacent to the front sidewall of the grill. Therefore, the front portion of the hinged container may not open the hinged container when the front sidewall of the grill is adjacent the front portion and the rear portion is being secured in an upright position via the coupling member and/or the rear sidewall of the grill.

At operation 450, the lid may be placed on grill to close the opening of the grill.

At operation 460, when the lid closes the opening, the hinged container may be turned, rotated, revolved, etc. three hundred and sixty degrees within the grill, while the back and front portions of the hinged containers are maintained adjacent to a sidewall of the grill. Therefore, when the lid is closed, the hinged containers may automatically be placed in the closed position.

At operation 470, the lid may be opened, and the shaft may be rotated to positioned a hinged container may be positioned within the opening. Responsive to moving the hinged container to the open portion of the grill, a front portion of the hinged container may rotate towards the front sidewall of the grill. When rotating the front portion of the hinged container, the front portion of the hinged container may be rotated up to a ninety degree angle with respect to a rear portion of the hinged container, wherein the rear portion of the hinged container may be positioned adjacent to the coupling member. When the hinged container is opened, food may be removed from the hinged container.

Figure 5:
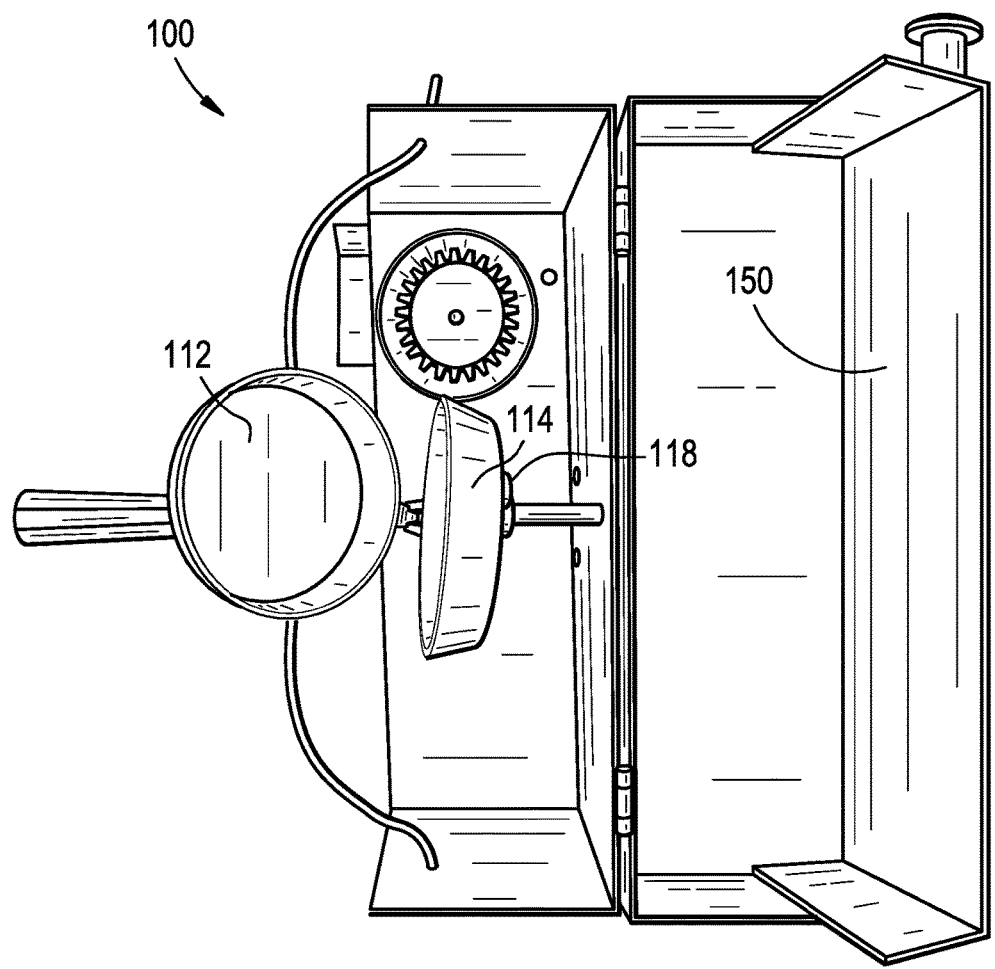
FIG. 5 depicts a top view of a hinged container in the opened position, according to an embodiment.

FIG. 5 depicts one embodiment of a top view of hinged container 110 in the open position. As depicted in FIG. 5, coupling member 118 maintains rear portion 112 of hinged container 110 in a direction perpendicular to shaft 140. Accordingly, while hinged container 110 is positioned within chamber 110, rear portion may always extend away from shaft 140.

Furthermore, as depicted in FIG. 5, coupling member 118 may be fixed at a position along shaft 140, wherein coupling member 118 is fixed at a distance that allows for a front surface of front portion 112 to be positioned adjacent to front sidewall 120 when front portion 112 is positioned within chamber 100.

Figure 6:
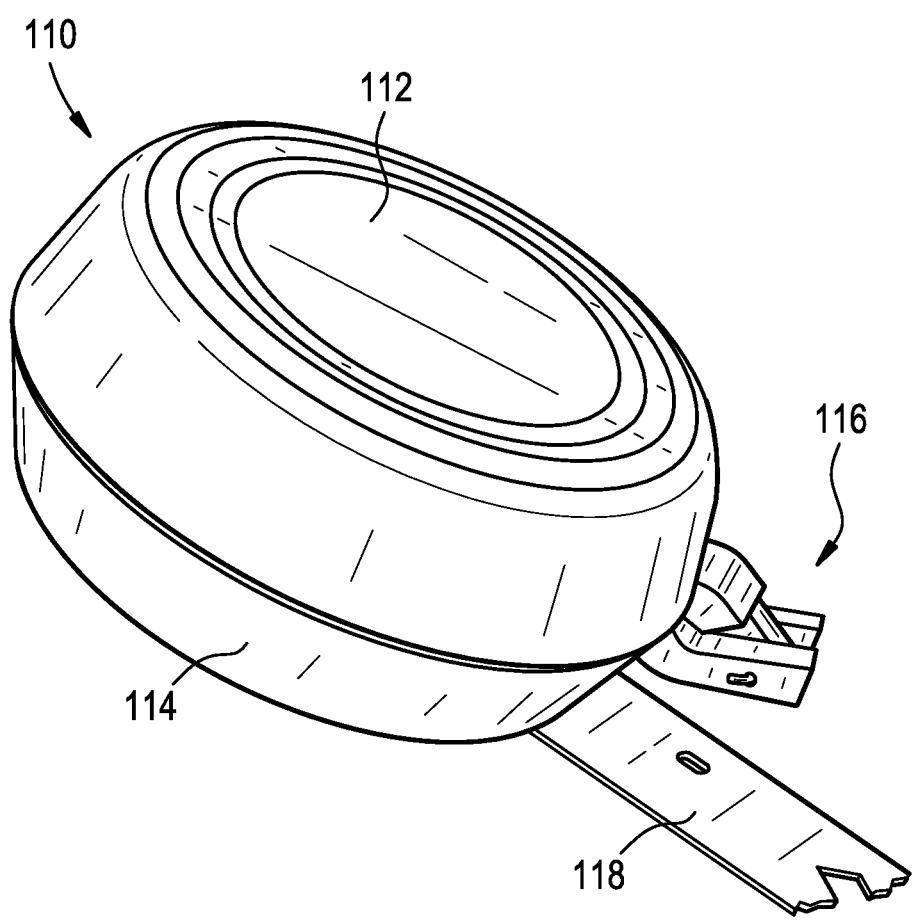
FIG. 6 depicts a hinged container in the closed position, according to an embodiment.

FIG. 6 depicts one embodiment of hinged container 110 in the closed position. As depicted in FIG. 6, when hinged container 110 is in the closed position, the inner surfaces of front portion 112 and rear portion 114 are positioned adjacent to each other.

Furthermore, as depicted in FIG. 6, coupling member 118 is positioned behind an outer surface of rear portion 114 to not allow rear portion 114 to rotate. Hinge 116 may be positioned in front of coupling member 118, which may allow front portion 112 to rotate away front rear portion 114.

Figure 7:
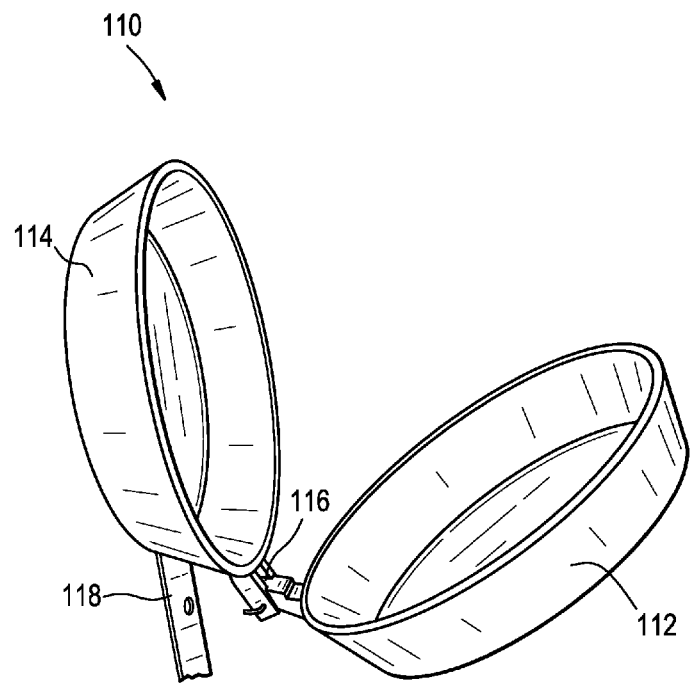
FIG. 7 depicts a hinged container in the opened position, according to an embodiment.

FIG. 7 depicts one embodiment of hinged container 110 in the open position. As depicted in FIG. 7, when hinged container 110 is in the open position, the inner surfaces of front portion 112 and rear portion 114 are positioned apart from each other, which may allow food to be positioned within hinged container 110.

Furthermore, via hinge 116 front portion 112 may be able to rotate to an angle that is approximately ninety degrees apart from rear portion 114 to enable support for front portion 112 during the insertion or removal of an item into the hinged container 110.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

The flowcharts and block diagrams in the flow diagrams illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s).

What is claimed is:

1. A vertical rotisserie grill system, comprising:
   a chamber defined by a hollow cavity between a front sidewall and a rear sidewall;
   a lid configured to be removable coupled from the chamber, when the lid is removed from the chamber an opening is formed in the front sidewall of the chamber;
   a shaft extending through the hollow cavity from the front sidewall and the rear sidewall, the shaft being configured to rotate;
   a hinged container including a front portion and a rear portion, the rear portion being positioned in a fixed upright position in parallel to the rear sidewall, in a first position the front portion of the hinged container being configured to rotate forward when the hinged container is positioned within the opening in the front sidewall of the chamber, and in a second position the front portion of the hinged container being configured to be positioned adjacent to the front sidewall of the chamber when the lid is positioned on the chamber, wherein the hinged container is also positioned in the second position when the front portion of the hinged container is not positioned within the opening in the front sidewall of the chamber;
   a coupling member being configured to couple the hinged container to the shaft; and
   a first concave rail and a second concave rail positioned along an upper surface of the front sidewall, the first concave rail extending from a first side of the chamber to a middle of the chamber, and the second concave rail extending from the middle of the chamber to a second side of the chamber.

2. The system of claim 1, wherein the first concave rail and the second concave rail are configured to control the rotation of the front portion, wherein when the front portion rotates an outer surface of the front portion is positioned on at least one of the first concave rail and the second concave rail.

3. The system of claim 1, wherein the hinged container is configured to rotate around an axis defined by the shaft.

4. The system of claim 1, wherein when the lid is coupled with the chamber, an inner surface of the lid acts as an extension of the front sidewall.

5. The system of claim 1, wherein the rear portion is positioned adjacent to the rear sidewall of the chamber.

6. The system of claim 1, wherein the lid is coupled to the rear sidewall of the chamber.

7. The system of claim 1, including a plurality of hinged containers.

* * * * *